Figure 1:
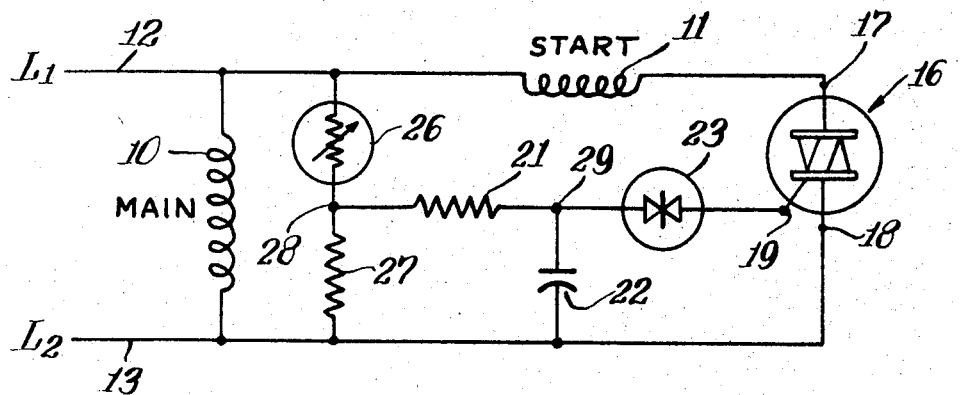

United States Patent [19]
Woods

[11] 3,832,612
[45] Aug. 27, 1974

[54] ELECTRICAL TIMING CIRCUIT FOR CONTROLLING ENERGIZATION OF A LOAD

[75] Inventor: Richard E. Woods, Markle, Ind.

[73] Assignee: Franklin Electric Co., Inc., Bluffton, Ind.

[22] Filed: July 29, 1970

[21] Appl. No.: 59,257

[52] U.S. Cl. .............................. 318/221 E, 318/227
[51] Int. Cl. .............................................. H02p 1/44
[58] Field of Search ............ 318/221 E, 221 R, 227, 318/229

[56] References Cited
UNITED STATES PATENTS

| | | | |
|---|---|---|---|
| 3,495,150 | 2/1970 | Enemark | 318/221 R |
| 3,519,911 | 7/1970 | Frank | 318/221 |
| 3,530,348 | 9/1970 | Conner | 318/227 X |
| 3,544,869 | 12/1970 | Plouffe et al. | 318/227 |

Primary Examiner—Gene Z. Rubinson
Attorney, Agent, or Firm—Hibben, Noyes & Bicknell

[57] ABSTRACT

This disclosure deals with a split phase induction motor including a main winding and a start winding. To de-energize the start winding after the motor has started, a solid state electronic switch is connected in series with the start winding and an oscillator is connected to actuate the switch. An electrical element having an impedance which varies with the temperature thereof is connected to control operation of the oscillator. When the motor is initially energized, the temperature of the element is low, the oscillator operates, and the switch is closed. As the motor speeds up, the element is heated, such heating changing its electrical impedance. When the temperature of the element reaches a certain value, the oscillator is turned off, the switch is opened and the start winding is de-energized.

15 Claims, 3 Drawing Figures

ELECTRICAL TIMING CIRCUIT FOR CONTROLLING ENERGIZATION OF A LOAD

A split phase induction motor includes a main or running winding and a start winding which is angularly displaced from the main winding. The start winding provides starting torque during start-up of the motor and it is de-energized or cut out when the motor is operating at running speeds. Usually a switch actuated by a centrifugal mechanism is provided to de-energize the start winding, but non-mechanical switch circuits have also been designed for this purpose. Switch arrangements as discussed above respond to the speed of the motor and de-energize the start winding when the motor has reached a certain percentage of running speed, often referred to as the cut-out speed.

Where a motor is designed for operation with a known inertia load which does not change appreciably, the length of time required for the motor to reach cut-out speed with such a load can be determined and a timing arrangement can be included in the motor to cut out the start winding a generally constant length of time after initial energizations.

It is therefore a primary object of the present invention to provide a relatively inexpensive, uncomplicated and reliable time control circuit for cutting out the start winding of a split phase induction motor. The circuit comprises an electronic switch connected in series with the start winding, a trigger circuit connected to actuate the switch, and a timing circuit connected to control operation of the trigger circuit. One element of the timing circuit has an impedance that varies with the temperature thereof, and this element is heated as the motor is started. The trigger circuit responds to the impedance of the element and opens the electronic switch when the temperature of the element reaches a critical value.

Figure 2:
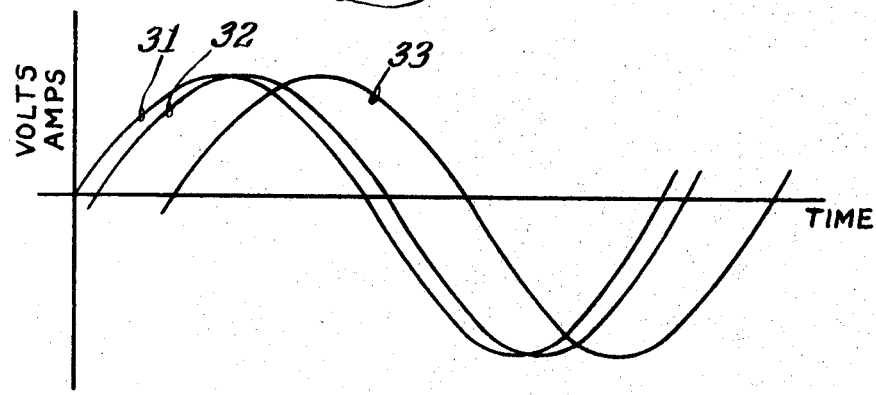
Figure 3:
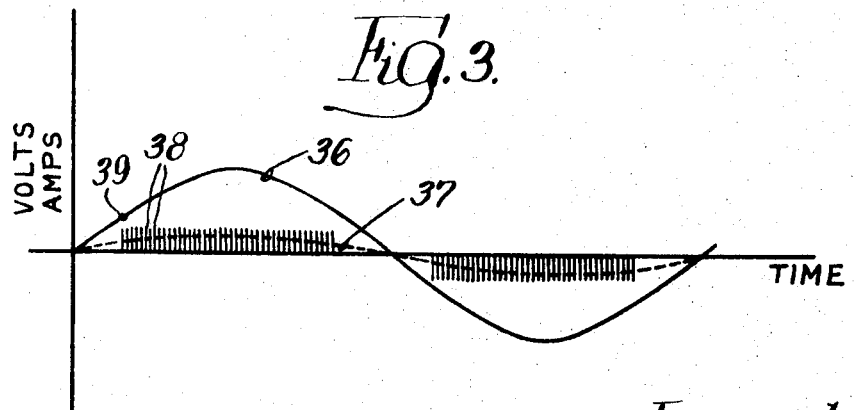

Additional advantages of the present invention will be apparent from the following detailed description taken in conjunction with the accompanying figures of the drawing, wherein:

FIG. 1 is a schematic diagram of an electric motor including a circuit embodying the present invention; and FIGS. 2 and 3 are schedules of waveforms illustrating the operation of the circuit.

In FIG. 1 is schematically illustrated a split phase induction motor including a main winding 10 and a start winding 11, the two windings 10 and 11 being parallel connected to be energized by two power lines 12 and 13. The start winding 11 is angularly displaced on the motor stator (not shown) from the main winding 10, and the start winding circuit has a different reactance from the main winding circuit, thus producing a time or phase displacement in addition to the angular displacement. The difference in the reactances of the start and main winding circuits may be produced, for example, by making the resistances of the start and main windings different, or by connecting a capacitor in series with the start winding. The combination of the angular and time displacements discussed above provides starting torque when the motor is initially connected to line power.

To control energization of the start winding 11, a solid state electronic switch 16 is connected in series with the start winding 11, the switch 16 comprising a TRIAC having two main terminals 17 and 18 and a gate 19. The main terminal 17 is connected to the start winding 11 while the other main terminal 18 is connected to the power line 13 which, in the present illustration, is also the reference ground. The TRIAC 16 is a solid state device having characteristics such that it is triggered to conduction in either direction of current flow by a potential existing across the main terminals 17 and 18 and, simultaneously, by a current pulse on the gate 19. Once the TRIAC 16 is triggered to conduction, it will continue to conduct until current passes through zero crossing even though the pulse is discontinued or until the potential across the terminals 17 and 18 is removed.

Triggering of the TRIAC 16 is accomplished by a relaxation oscillator including a resistor 21, a capacitor 22, and a breakdown device 23 which in the present instance is a DIAC. The oscillator in turn is controlled by a timing circuit including an electrical element 26 having an impedance that varies with the temperature thereof, and a resistor 27, the element 26 and the resistor 27 being connected in series across the two power lines 12 and 13 to form a voltage divider. The element 26 consists of a positive temperature coefficient (PTC) resistor having characteristics such that its resistance is relatively low when its temperature is low but sharply increases by several orders of magnitude when the temperature thereof reaches a critical or switching temperature. The element 26 may be heated either by a separate heating coil or by resistance heating arising from the current flowing therethrough. In the present instance, the current flowing through the element 26 and the resistor 27 is relied upon to increase the temperature of the element 26 when the power lines 12 and 13 are connected to a power supply.

When the element 26 is at ambient temperature, its resistance is relatively low as mentioned above, and the potential at the junction 28 between the element 26 and the resistance 27, measured from the power line 13, is relatively high. However, when the element 26 is heated above its critical temperature the potential at the junction 28 falls. The foregoing change in potential at the junction 28 is utilized to control the operation of the switch 16.

The junction 28 is connected to one side of the resistor 21, the other side of the resistor 21 being connected through the capacitor 22 to the power line 13. The DIAC 23 is connected between the gate 19 of the TRIAC 16 and the junction 29 of the resistor 21 with the capacitor 22.

During operation of the relaxation oscillator, the potential at the junction 28 charges the capacitor 22 until the potential of the junction 29 reaches the breakdown or breakover voltage of the DIAC 23. At this time, the DIAC 23 conducts current and the resistance of the DIAC falls to a low value. The capacitor 22 discharges through the DIAC 23, the gate 19 and the terminal 18 circuit until the current flow from the capacitor 22 falls below the value at which the DIAC 28 will continue to conduct, which is referred to as the extinguishing current of the DIAC 23. The capacitor 22 then again begins to charge, and the foregoing cycle is repeated so long as the potential at the junction 28 is above the breakover voltage of the DIAC 28.

The operation of the circuit shown in FIG. 1 is illustrated by the waveforms in FIGS. 2 and 3, wherein waveform 31 represents power line voltage appearing across the power lines 12 and 13, the waveform 32 represents current flow through the start winding 11 circuit when the switch 16 is closed and under locked rotor conditions, and the waveform 33 represents the current flow through the start winding 11 circuit when the switch 16 is closed and the motor is substantially at running speed. It will be noted from FIG. 2 that the time lag of the start winding current with respect to line voltage increases from a value of approximately 15° to a value of approximately 65° as the rotor gains speed.

With reference to FIG. 3, the waveform 36 represents the voltage appearing at the junction 28 when the temperature of the PTC element 26 is relatively low, and the waveform 37 represents the potential at the junction 28 when the element 21 is heated. The lines 38 represent current pulses from the relaxation oscillator.

When line power is initially connected to the lines 12 and 13 to start the motor, line voltage, represented by the waveform 31, appears across the main winding 10 and across the voltage divider consisting of the element 26 and the resistor 27. Line voltage also appears across the TRIAC 16, but, assuming that line power is applied at the time that the waveform 31 crosses the zero reference line on the rise side of the wave, the TRIAC 16 is open and current does not flow through the start winding 11. The potential at the junction 28, represented by the numeral 36, increases and charges the capacitor 22 until it reaches the level 39 (FIG. 3) which is the breakover voltage of the DIAC 23. At this level the DIAC 23 fires and the capacitor 22 discharges through the DIAC 23 to the gate 19 of the TRIAC 16 as represented by the first of the current pulses 38.

It will be noted from a time comparison of the waveforms of FIGS. 2 and 3 that the current waveform 32 is above the zero reference line at the time that the first of the pulses 38 appears. Consequently, the trigger pulse 38 triggers the TRIAC 16 into conduction and current flows through the start winding 11 until the waveform 32 falls to zero and turns the TRIAC 16 off. The TRIAC 16 remains off in the negative going portion of the waveform 32 until a trigger pulse 38 generated during the negative going excursion of the line voltage again triggers the TRIAC 16 on, resulting in current flow through the start winding 11 and the TRIAC 16 in the opposite direction.

As the motor speeds up, the phase lag of the start winding current increases from the waveform 32 position toward the waveform 33 position. In spite of this phase shift, the TRIAC 16 is triggered on as soon as the start winding passes the zero reference line because there is always a trigger pulse 38 ready to trigger the TRIAC into conduction. The value of the oscillator circuit therefore is that it provides a steady stream of trigger pulses, any one of which can trigger the TRIAC into conduction regardless of the phase lag of the start winding current.

The potential at the junction 28 falls when the current flowing through the element 26 heats the element 26 to its critical temperature. When the potential at the junction 28 falls below the level 39, as indicated by the waveform 37, the relaxation oscillator ceases to generate pulses and the TRIAC 16 is no longer triggered to conduction, resulting in disconnection of the start winding 11 from the power lines 12 and 13. The motor then runs solely on the main winding 10 and continued current flow through the element 26 and the resistor 27 maintains the temperature of the element 26 above its critical value.

When designing a circuit of the character shown in FIG. 1 for a particular application, the characteristics of the element 26 should be such that its critical temperature is well above the ambient temperatures expected to be encountered so that the resistance of the element 26 is relatively low when the motor is initially energized. Further, the length of time required for the element 26 to reach its critical temperature should be slightly greater than the length of time required for the motor to reach cut-out speed with the inertia load anticipated. The relative resistances of the element 26 and the resistor 27 should also be matched to make the potential at the junction 28 greater than the DIAC breakdown voltage at initial energization but less than the DIAC breakdown voltage at above the critical temperature.

With regard to the relaxation oscillator, the time constant of the resistor 21 and the capacitor 22 determines the frequency of the oscillator. When using 60 cycle line power, a time constant of one millisecond or less is preferred. Further, the capacitor 22 should be sufficiently large to supply enough energy to trigger the TRIAC 16 to conduction. Also, the resistor 21 should be large enough that it will not pass enough current from the junction 28 to the DIAC 23 to prevent the DIAC 23 from extinguishing even after the capacitor 22 has discharged. If the resistor 21 were relatively small, after the DIAC 23 has fired, current from the junction 28 could flow through the resistor 21 and the DIAC 23 and maintain the DIAC 23 conducting even after the capacitor 22 has discharged, thus preventing the generation of further pulses of sufficient magnitude to fire the TRIAC 16.

As a specific example, the following are the approximate values of a circuit designed to operate with 115 volts R.M.S., 60 cycle A.C. line power, and with a motor having a cut out time of 0.5 to 0.8 second:

| | |
|---|---|
| element 26 | 1 K at 25°C |
| | 8 K at above 120°C |
| resistor 27 | 1 K |
| resistor 21 | 22 K |
| capacitor 22 | 0.01 MFD, 25 VDC |
| DIAC 23 | MPT 20 |
| TRIAC 16 | A01042 |

With the foregoing values, the potential at junction 28 at 25°C is approximately 57.5 volts R.M.S. and the potential at 120°C is approximately 14.4 volts R.M.S., the latter value being reached in approximately 1.0 second. The breakover voltage of the DIAC 23 is approximately 20 volts. The relaxation oscillator operates at a frequency in excess of 3,300 pulses per second beginning at approximately 18° from the zero line crossing of line voltage and ending at approximately 140°.

While the foregoing circuit has been described as cutting out the start winding a certain length of time after initial application of power, it should be noted that the motor speed at which the start winding is cut out is generally constant in spite of fluctuations in the value of line voltage. If the line voltage were above 115 volts R.M.S., for example, the motor would accelerate more rapidly and the element 26 would heat more rapidly, thus compensating for each other. The same would also be true for a line voltage below 115 volts.

Thus, the present invention has the further advantage of compensating for variations in line voltage.

I claim:

1. A split phase induction motor for use in an AC power system and designed to drive a known generally constant inertia load, the approximate cut-out speed with said load being known, said motor comprising a main winding, a start winding connected in parallel with said main winding, an electronic switch connected in series with said start winding, a timing circuit connected to respond to initial energization of said motor and having a critical value which is reached a substantially constant switching time after initial energization of said motor, said switching time being at least as long as said cut-out time and having a duration extending over a plurality of AC cycles, and trigger circuit means connecting said timing circuit to said switch, said timing circuit actuating said trigger circuit, said trigger circuit including means having at least one electrical element therein for generating a trigger pulse in each AC half cycle until the expiration of said switching time, and said switch being closed by each trigger pulse and thus being closed in each half cycle until the expiration of said switching time.

2. A motor as in claim 1, wherein said timing circuit includes a temperature sensitive resistor having a resistance that changes sharply at a critical temperature, said resistor being connected to be heated by line power applied to said motor, and said trigger circuit being responsive to said changes in resistance.

3. A split phase induction motor for use in an AC power system and designed to drive a known generally constant inertia load, the approximate cut-out speed with said load being known, said motor comprising a main winding, a start winding connected in series with said start winding, a timing circuit connected to respond to initial energization of said motor and having a critical value which is reached a substantially constant switching time after initial energization of said motor, said switching time being at least as long as said cut out time and having a duration extending over a plurality of AC cycles, and trigger circuit means connecting said timing circuit to said switch, said timing circuit actuating said trigger circuit means to generate a trigger pulse in each AC half cycle until the expiration of said switching time, and said switch being closed by each trigger pulse and thus being closed in each half cycle until the expiration of said switching time, said trigger circuit means comprising an oscillator circuit.

4. A start winding cut-out circuit for a split phase induction motor for use in an AC power system and including a main winding and a start winding, said circuit comprising an electronic switch adapted to be connected in series with said start winding, said switch including a gate which closes said switch in response to a trigger pulse appearing thereon, trigger circuit means having at least one electrical element therein connected to said gate for generating at least one trigger pulse in each AC half cycle, and timing means connected to respond to initial energization of said motor and connected to control operation of said trigger circuit means, said timing means having a timing period which is initiated substantially at initial energization of said motor and which ends after a substantially constant time, said timing means being connected to and actuating said trigger circuit to enable generation of trigger pulses only during said timing period.

5. A start winding cut-out circuit for a split phase induction motor for use in an AC power system and including a main winding and a start winding, said circuit comprising an electronic switch adapted to be connected in series with said start winding, said switch including a gate which closes said switch in response to a trigger pulse appearing thereon, trigger circuit means connected to said gate for generating at least one trigger pulse in each AC half cycle, and timing means connected to respond to initial energization of said motor and connected to control operation of said trigger circuit means, said timing means having a timing period which is initiated substantially at initial energization of said motor and which ends after a substantially constant time, said timing means being connected to enable generation of trigger pulses only during said timing period, said trigger circuit means comprising an oscillator.

6. A circuit as in claim 5, wherein said timing means comprises a temperature sensitive electrical resistor, said oscillator being connected to be responsive to changes in the resistance of said temperature sensitive resistor.

7. A start winding control circuit for an electric motor including a main winding and a start winding, said windings being connectable by a pair of power lines to A.C. line power for energization thereof, said circuit comprising an electronic switch adapted to be connected in series with said start winding, said switch including a gate which controls opening and closing of said switch, a temperature responsive variable impedance element adapted to be connected to line power upon connection of said windings to line power, and a trigger circuit means having at least one electrical element therein connecting said temperature responsive variable impedance element to said switch and responsive to an increase in the temperature and impedance of said temperature responsive variable impedance element for generating a trigger pulse when the impedance of said temperature responsive variable impedance element is below a critical value, said trigger pulse being connected to said gate whereby operation of said switch is controlled by the temperature of said temperature responsive variable impedance element.

8. A control circuit as in claim 7, wherein said variable resistance element comprises an electrical resistor having a high positive temperature coefficient of resistance.

9. A circuit for controlling current flow through a load, said load being adapted to be connected to an AC power supply by a pair of power lines, said circuit comprising an electronic switch adapted to be connected in series with said load, a timing circuit adapted to be connected across said power lines, and a trigger circuit means having at least one electrical element therein for generating a trigger pulse when actuated, said trigger circuit connecting said timing circuit to said switch, said timing circuit having a timing period which is initiated upon initial energization of the power lines and which ends after a substantially constant time, said timing circuit being connected to actuate said trigger circuit during said timing period, said actuation of said trigger circuit causing said trigger circuit to close said switch.

10. A circuit for controlling current flow through a load, said load being adapted to be connected to an AC power supply by a pair of power lines, said circuit comprising an electronic switch adapted to be connected in series with said load, a timing circuit adapted to be connected across said power lines, and a trigger circuit connecting said timing circuit with said switch, said timing circuit actuating said trigger circuit a generally constant length of time after initial energization of said load, said actuation of said trigger circuit causing said trigger circuit to open said switch, said timing circuit comprising a first resistor having a high positive temperature coefficient of resistance, and a second resistor, said two resistors being serially connected, and said trigger circuit including a relaxation oscillator comprising a third resistor, a capacitor, and a breakdown device, said third resistor being connected between said capacitor and the junction of said first and second resistors and said breakdown device being connected between said switch and the junction of said capacitor and said third resistor.

11. A circuit as in claim 10, wherein said breakdown device is a DIAC and said switch is a TRIAC.

12. A start winding cut-out circuit for a split phase induction motor used in an AC power system, said motor including a main winding and a start winding, said circuit comprising a switch adapted to be connected in series with said start winding, said switch being turned on in response to an electrical pulse and being turned off at the end of an AC half cycle, a trigger circuit means having at least one electrical element therein connected to said switch for generating a pulse in said AC half cycle, said trigger circuit generating said pulse when a voltage applied thereto reaches a predetermined value, and timing circuit means connected to said trigger circuit, being responsive to line voltage and being connected to supply said voltage to said trigger circuit, said timing circuit including a variable element controlling generation of said voltage and operable at a predetermined time after initial energization of said motor to prevent said voltage from reaching said level.

13. A circuit as in claim 12, wherein said switch conducts current in both directions, and said trigger circuit generates pulses to turn said switch on in both AC half cycles until said predetermined time.

14. A system for controlling the operation of an induction motor having a start winding and a run winding comprising a first selectively energizable semiconductor current switch means having a pair of power terminals and a control terminal for controlling current flow between said power terminals, said power terminals being serially connected between the start winding and a source of power, trigger means including a first temperature-responsive element having a resistance which varies in response to the temperature thereof and being adapted for operation in a current-limiting self-heating mode coupled to said control terminal for controlling the flow of current thereto so as to control the energization of said first switch means and being adapted to conduct triggering current to said control terminal to render said first switch means conductive for a predetermined time interval until current limiting operation thereof is initiated causing a reduction in the flow of current therethrough so as to render said first switch means non-conductive after said predetermined time interval, said first temperature-responsive element being coupled to said run winding so as to receive sufficient current subsequent to said predetermined time interval to remain operational in its self-heating mode to preclude additional current flow to the start winding during running of the motor, and means for energizing the start winding and said trigger means so as to apply triggering current to said first temperature-responsive element to energize said switch means and permit current flow to the start winding during said predetermined time interval, thereby effecting starting of the motor.

15. A system for controlling the operation of an induction motor having a start winding and a run winding comprising a first selectively energizable semiconductor switch device having a pair of power terminals and a control terminal for controlling the flow of current between said power terminals in response to a triggering current, said power terminals being connected between the start winding and a source of power, trigger means, including a first PTC thermistor adapted for operation in a high-resistance mode coupled to said control terminal for controlling the application of triggering current thereto, said first PTC thermistor being adapted to conduct current substantially in excess of said triggering current prior to the initiation of operation in its high-resistance mode so as to abruptly energize said switch device for a predetermined time interval, high-resistance operation of said first PTC thermistor being positively initiated upon expiration of said predetermined time interval effecting a reduction in the flow of current therethrough rendering said switch device nonconductive, said first PTC thermistor being coupled to the run winding to receive sufficient current during running of the motor subsequent to said predetermined time interval to maintain said first PTC thermistor operational in its high-resistance mode, and current-limiting means including at least two electrically connected resistors coupled between said first PTC thermistor and said control terminal and between said first PTC thermistor and one of said power terminals of said switch device respectively for limiting the current applied to said control terminal to a level sufficient to maintain said switch device conductive only until high-resistance operation of said first PTC thermistor is effected, said current-limiting means being effective to limit triggering current supplied to said control terminal when the current flow through said first PTC thermistor is reduced due to high-resistance operation thereof to effect abrupt deenergization of said switch device, and means for energizing the start winding and said trigger means so as to apply triggering current through said first PTC thermistor to energize said switch device, whereby current flow is effected through the start winding during said predetermined time interval, wherein said first switch device comprises a first triac having its gate connected in series with said first PTC thermistor through one of said resistors, said first triac being rendered nonconductive due to a reduction in the voltage across said resistors as high-resistance operation of said first PTC thermistor is initiated, and wherein triac-firing means including a trigger diode and a capacitor are coupled to the gate of said triac, said capacitor being connected across said resistors for storing the voltage appearing across said resistors until a sufficient voltage level is established across said capacitor to fire said trigger diode, thereby applying a trigger pulse to abruptly energize said triac.

* * * * *